(12) United States Patent
Linderoth et al.

(10) Patent No.: US 10,834,305 B2
(45) Date of Patent: Nov. 10, 2020

(54) SYSTEM AND METHOD FOR PROVIDING VIRTUAL PAN-TILT-ZOOM, PTZ, VIDEO FUNCTIONALITY TO A PLURALITY OF USERS OVER A DATA NETWORK

(71) Applicant: SPIIDEO AB, Malmö (SE)

(72) Inventors: Magnus Linderoth, Lund (SE); Håkan Ardö, Lund (SE); Klas Josephson, Malmö (SE)

(73) Assignee: SPIIDEO AB, Malmö (SE)

(*) Notice: Subject to any disclaimer, the term of this patent is extended or adjusted under 35 U.S.C. 154(b) by 0 days.

(21) Appl. No.: 16/092,467

(22) PCT Filed: Apr. 11, 2017

(86) PCT No.: PCT/SE2017/050364
§ 371 (c)(1),
(2) Date: Oct. 10, 2018

(87) PCT Pub. No.: WO2017/180050
PCT Pub. Date: Oct. 19, 2017

(65) Prior Publication Data
US 2019/0109975 A1 Apr. 11, 2019

(30) Foreign Application Priority Data
Apr. 11, 2016 (SE) ...................................... 1650488

(51) Int. Cl.
*H04N 5/232* (2006.01)
*H04N 5/247* (2006.01)
(Continued)

(52) U.S. Cl.
CPC .......... *H04N 5/23206* (2013.01); *G06T 7/80* (2017.01); *H04N 5/04* (2013.01); *H04N 5/232* (2013.01);
(Continued)

(58) Field of Classification Search
CPC ........... H04N 5/23206; H04N 5/23216; H04N 21/816; H04N 5/2628; H04N 21/47217;
(Continued)

(56) References Cited

U.S. PATENT DOCUMENTS

2010/0259595 A1 10/2010 Trimeche et al.
2012/0098925 A1 4/2012 Dasher et al.
(Continued)

FOREIGN PATENT DOCUMENTS

CN 102368810 A 3/2012
CN 103442221 A 12/2013
(Continued)

OTHER PUBLICATIONS

Vamsidhar Reddy Gaddam et al. 2014. Interactive Zoom and Panning from Live Panoramic Video. In Proceedings of Network and Operating System Support on Digital Audio and Video Workshop (NOSSDAV '14). ACM, New York, NY, USA, p. 19, 6 pages.

(Continued)

*Primary Examiner* — Mekonnen D Dagnew
(74) *Attorney, Agent, or Firm* — Ballard Spahr LLP

(57) ABSTRACT

A system for providing virtual pan-tilt-zoom, PTZ, video functionality video to a plurality of users over a data network is provided. The system includes one or more network video cameras positioned to make a video recording of a real-world target field, or a respective subarea thereof, and output a respective raw video segment onto the data network, a back-end camera calibration unit which is adapted to obtain a relative position and orientation of the respective network video camera with respect to a three dimensional world space for the target field, and to save the obtained relative position and orientation as metadata for the respective network video camera, a back-end video processing unit, connected to the data network and adapted to receive the (Continued)

respective raw video segment(s) recorded by the network video camera(s), and to store or buffer video contents of the respective raw video segment(s) in a back-end video storage, a back-end video streaming unit adapted to stream the stored or buffered video contents and the saved metadata for the respective network video camera onto the data network, a plurality of client devices for use by the plurality of users.

16 Claims, 10 Drawing Sheets

(51) Int. Cl.
| | |
|---|---|
| H04N 21/6587 | (2011.01) |
| H04N 21/218 | (2011.01) |
| H04N 21/472 | (2011.01) |
| H04N 5/262 | (2006.01) |
| H04N 21/81 | (2011.01) |
| G06T 7/80 | (2017.01) |
| H04N 5/04 | (2006.01) |
| H04N 17/00 | (2006.01) |

(52) U.S. Cl.
CPC ..... *H04N 5/23216* (2013.01); *H04N 5/23299* (2018.08); *H04N 5/247* (2013.01); *H04N 5/2628* (2013.01); *H04N 21/21805* (2013.01); *H04N 21/47217* (2013.01); *H04N 21/6587* (2013.01); *H04N 21/816* (2013.01); *H04N 17/002* (2013.01)

(58) Field of Classification Search
CPC ......... H04N 21/21805; H04N 21/6587; H04N 5/232; H04N 5/04; H04N 5/23299; H04N 5/247; H04N 17/002; G06T 7/80
See application file for complete search history.

(56) References Cited

U.S. PATENT DOCUMENTS

| | | | |
|---|---|---|---|
| 2012/0249831 | A1 | 10/2012 | Porter |
| 2012/0294366 | A1* | 11/2012 | Eliyahu ............... H04N 19/533 375/240.16 |
| 2013/0148861 | A1* | 6/2013 | Ferlatte ............. G06K 9/00624 382/107 |

FOREIGN PATENT DOCUMENTS

| | | |
|---|---|---|
| CN | 104012106 A | 8/2014 |
| CN | 104394400 A | 3/2015 |
| CN | 104636162 A | 5/2015 |

OTHER PUBLICATIONS

Vamsidhar Reddy Gaddam et al. 2014. Automatic Real-Time Zooming and Panning on Salient Objects from a Panoramic Video. In Proceedings of the 22nd ACM international conference on Multimedia (MM '14). ACM, New York, NY, USA, 725-726.
Arash Shafiei, et al. 2012. Jiku live: a live zoomable video streaming system. In Proceedings of the 20th ACM international conference on Multimedia (MM '12). ACM, New York, NY, USA, 1265-1266.
Hakon Kvale Stensland et al. 2014. Bagadus: An integrated real-time system for soccer analytics. ACM Trans. Multimedia Comput. Commun. Appl. 10, 1s, Article 14 (Jan. 2014), 21 pages.
Yildiz Alparslan et al., Evaluation and Fair Comparison of Human Tracking Methods with PTZ Cameras, Virtual, Augmented and Mixed Reality: 7th International Conference, VAMR 2015, Held as Part of HCI International 2015, Los Angeles, CA, USA, Aug. 2-7, 2015, Proceedings, 153,161,Springer International Publishing, 978-3-319-21067-4, (abstract).
L. Toni et al., "Interactive free viewpoint video streaming using prioritized network coding," 2013 IEEE 15th International Workshop on Multimedia Signal Processing (MMSP), Pula, 2013, pp. 446-451. (abstract).
Aditya Mavlankar et al. "Pre-fetching based on video analysis for interactive region-of-interest streaming of soccer sequences, Image Processing (ICIP)", 2009 16th IEEE International Conference on, Nov. 7, 2009, IEEE, Piscataway, NJ, USA, 978-1-4244-5653-6, pp. 3061-3064; (abstract).
A. Mavlankar et al., "Peer-to-peer multicast live video streaming with interactive virtual pan/tilt/zoom functionality," 2008 15th IEEE International Conference on Image Processing, San Diego, CA, 2008, pp. 2296-2299.
International Search Report and Written Opinion dated Jul. 14, 2017 on by the International Searching Authority for International Application No. PCT/SE2017/050364, filed on Apr. 11, 2017 and published as WO 2017/180050 on Oct. 19, 2017(Applicant—Spiideo AB) (13 Pages).
International Preliminary Report on Patentability dated Apr. 9, 2018 by the International Searching Authority for International Application No. PCT/SE2017/050364, filed on Apr. 11, 2017 and published as WO 2017/180050 on Oct. 19, 2017(Applicant—Spiideo AB) (19 Pages).
Office Action dated Apr. 13, 2020 by the SIPO Patent Office for CN Application No. 201780021360, filed on Apr. 11, 2017 and published as CN 108886583 A on Nov. 23, 2018 (Applicant—Spiideo AB)(Original 5 Pages//Translated 7 pages).

* cited by examiner

170
Receiving the streamed video contents and the metadata

180
Determining a chosen virtual pan-tilt-zoom value

190
Presenting, on a display of the client device, the video contents by projecting directions in the three dimensional world space onto the display based on the chosen virtual pan-tilt-zoom value and the metadata.

*Fig. 8b*

SYSTEM AND METHOD FOR PROVIDING VIRTUAL PAN-TILT-ZOOM, PTZ, VIDEO FUNCTIONALITY TO A PLURALITY OF USERS OVER A DATA NETWORK

CROSS-REFERENCE TO RELATED APPLICATIONS

This application is a U.S. National Phase Application of International Application No. PCT/SE2017/050364, filed Apr. 11, 2017, which claims priority to Swedish Application No. 1650488-8, filed Apr. 11, 2016, each of which are hereby incorporated by reference in their entirety.

TECHNICAL FIELD

This patent application describes an inventive system and an associated method of providing virtual pan-tilt-zoom, PTZ, video functionality to a plurality of users over a data network.

BACKGROUND

Sports clubs, such as football clubs, are becoming increasingly aware of the benefits of using video recordings of athletes and teams in practice and match. This is done in order to increase team and athlete performance, develop individual athlete skills and improve overall sports results.

To get access to video, one alternative is to use handheld regular cameras in the practice field and hire a camera man who is present all the time. This is however expensive, reduces the flexibility and time is wasted on a lot of inefficient manual camera work. In addition, the videos are in many cases of poor quality and fail to capture all important actions that happens simultaneously on different parts of the field.

Broadcast PTZ (pan-tilt-zoom) cameras are often used in television production for creating video streams of for example sporting events and matches. However, this is also a costly camera arrangement and requires a plurality of expensive PTZ-cameras to generate a good video quality from all angles. Installing PTZ-cameras in the training area is thus not an option for most smaller clubs, youth teams etc. due the great costs.

There is thus a need for a camera system providing video material for sports clubs, coaches and video analysts, that is easy to use, always available, flexible, inexpensive and set up to efficiently capture the entire practice or match field.

SUMMARY

An object of the present invention is therefore to provide a solution to, or at least a mitigation of, one or more of the problems or drawbacks identified in the background section above. A first aspect of the present invention is a system for providing virtual pan-tilt-zoom, PTZ, video functionality to a plurality of users over a data network.

The system comprises one or more network video cameras positioned to make a video recording of a real-world target field, or a respective subarea thereof, and output a respective raw video segment onto the data network. The system also comprises a back-end camera calibration unit which is adapted to obtain a relative position and orientation of the respective network video camera with respect to a three dimensional world space for the target field and save the obtained relative position and orientation as metadata for the respective network video camera. The system also comprises a back-end video processing unit, connected to the data network and adapted to receive the respective raw video segment(s) recorded by the network video camera(s), and store or buffer video contents of the respective raw video segment(s) in a back-end video storage.

Furthermore, the system comprises a back-end video streaming unit adapted to stream the stored or buffered video contents and the saved metadata for the respective network video camera onto the data network. Finally, the system comprises a plurality of client devices for use by the plurality of users. Each client device is adapted to receive the streamed video contents and the metadata, determine a chosen virtual pan-tilt-zoom value and present, on a display the client device, the video contents by projecting directions in the three dimensional world space, onto the display based on the chosen virtual pan-tilt-zoom value and the metadata.

The invention provides highly automated video recording and playback services which may be conveniently used, for instance, as a tool for coaches and athletes to analyze and discuss athletic performance on a real-world target field such as, for instance, a soccer pitch, hockey rink, handball court, basketball court, floorball court, volleyball court, etc. Hence, a system is provided where one or more cameras are used to capture a real-world target field (e.g. sports field), possibly with a very wide field of view. At playback, the viewer (e.g. a coach or an athlete) can choose where to look himself. This results in a virtual camera that can be reoriented and zoomed, as if the scene had been captured by a real PTZ (pan-tilt-zoom) camera. However, with this system the camera motion can be decided after the video is recorded.

Additionally or alternatively, the inventive video recording and playback services may be enjoyed by remote viewers in the form of live streaming of, for instance, sports events of any of the types referred to above.

A second aspect of the present invention is a method for providing virtual pan-tilt-zoom, PTZ, video functionality to a plurality of users over a data network. The method involves providing one or more network video cameras positioned to make a video recording of a real-world target field, or a respective subarea thereof, and output a respective raw video segment onto the data network. For the purpose of calibrating the or each of the network video camera(s), the method also involves obtaining a relative position and orientation of the respective network video camera with respect to a three dimensional world space for the target field, and saving the obtained relative position and orientation as metadata for the respective network video camera. The method also involves receiving over the data network the respective raw video segment(s) recorded by the network video camera(s), and storing or buffering video contents of the respective raw video segment(s) in a cloud-based video storage. Furthermore, the method involves streaming the stored or buffered video contents and the saved metadata for the respective network video camera onto the data network. Finally, the method involves, in respective client devices for use by respective one of the plurality of users receiving the streamed video contents and the metadata, determining a chosen virtual pan-tilt-zoom value, and presenting, on a display the client device, the video contents by projecting directions in the three dimensional world space onto the display based on the chosen virtual pan-tilt-zoom value and the metadata.

Embodiments of the invention are defined by the appended dependent claims and are further explained in the detailed description section as well as on the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

FIGS. 8a-b are flowchart diagrams illustrating a method for providing virtual pan-tilt-zoom video functionality according to an embodiment.

DETAILED DESCRIPTION OF EMBODIMENTS

Figure 1:
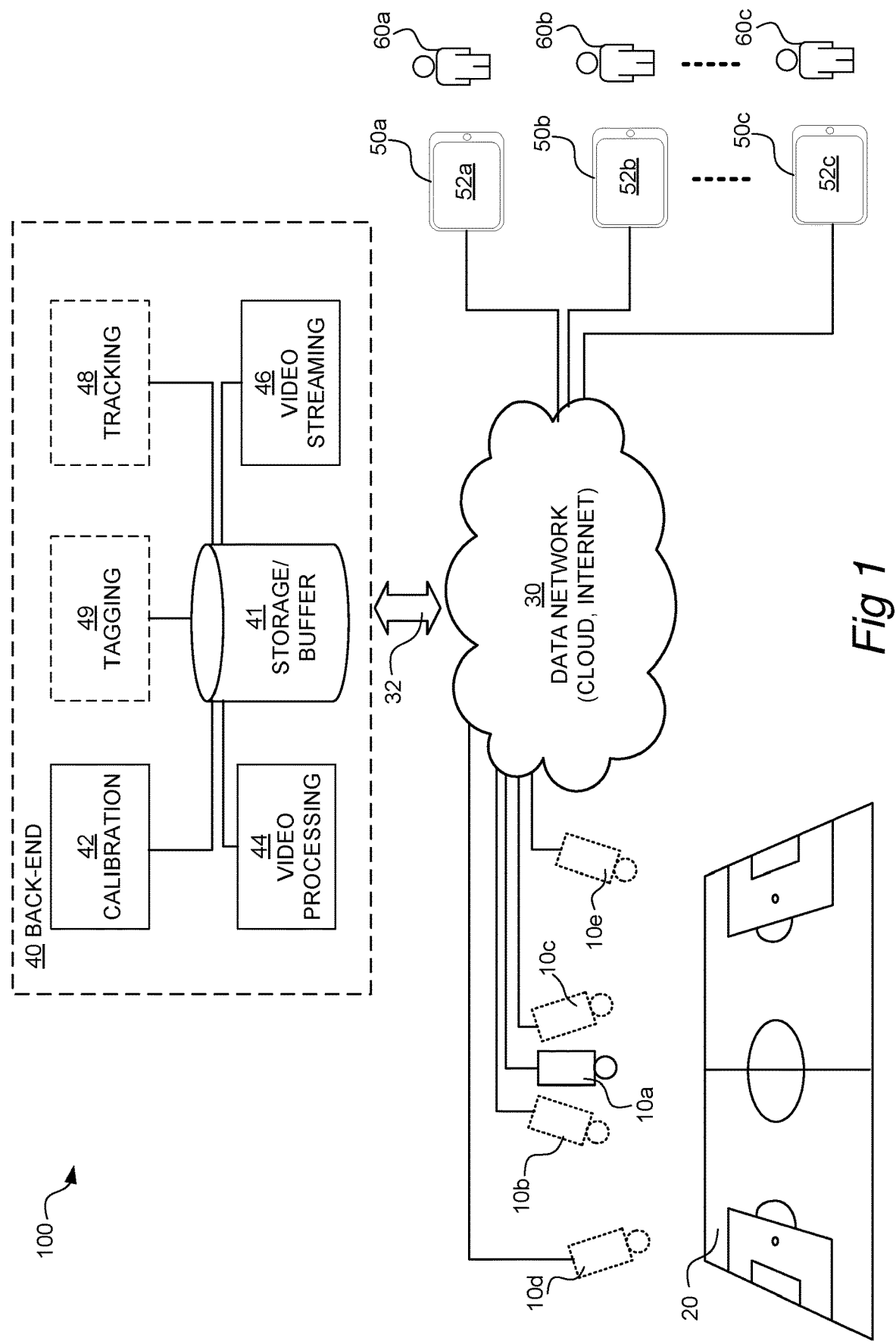
FIG. 1 is a schematic view of a system for providing virtual pan-tilt-zoom video functionality to a plurality of users over a data network according to one embodiment.
Figure 2:
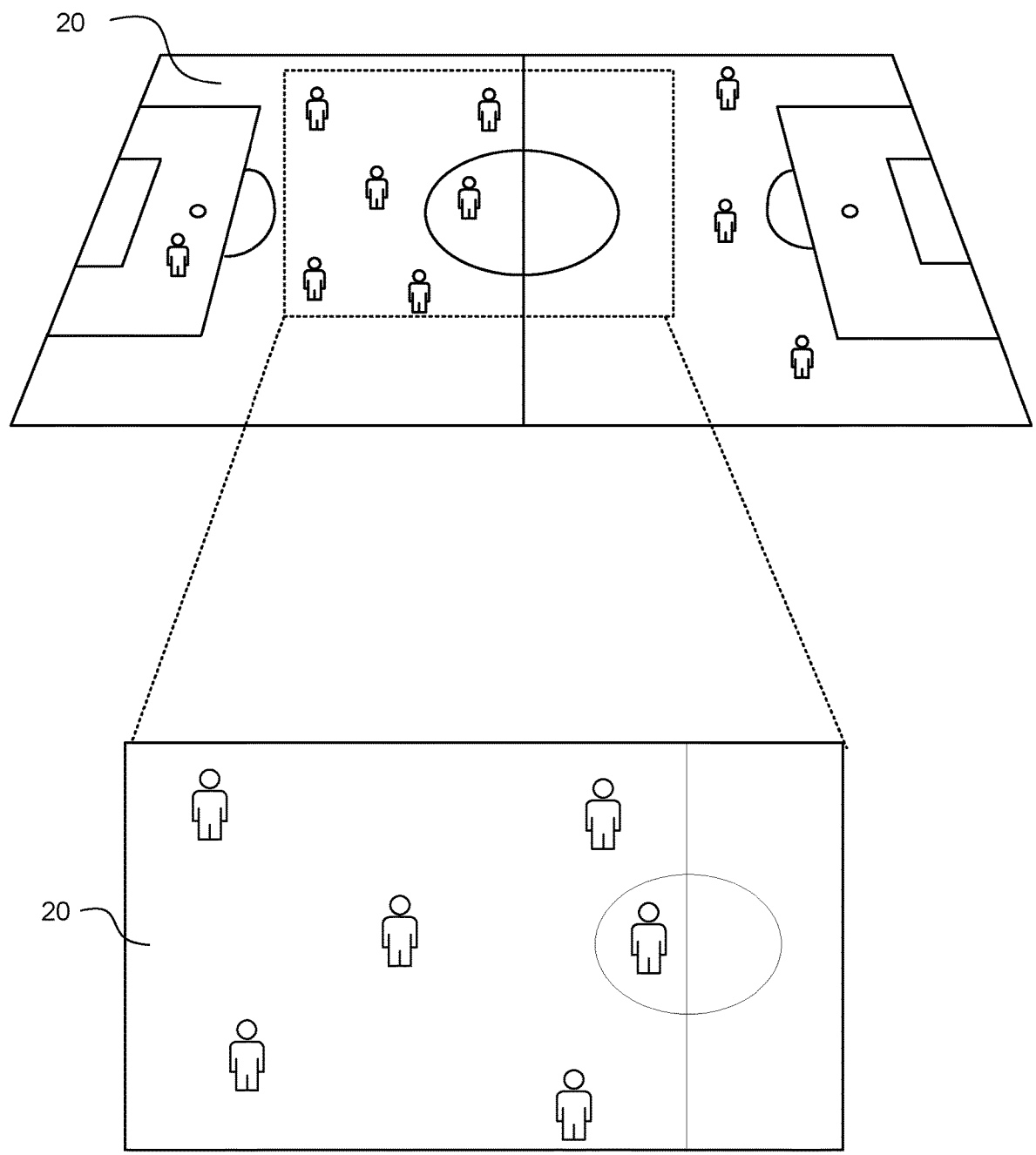
FIG. 2 is a schematic front view schematically illustrating the virtual pan-tilt-zoom function according to an embodiment.

FIG. 1 discloses a system 100 for providing virtual pan-tilt-zoom, PTZ, video functionality to a plurality of users 60a-60c over a data network 30. The data network may, for instance, be a wide-area network or aggregation of networks which form part of the Internet (commonly also referred to as the Cloud). The system 100 comprises one or more network video cameras 10a-10e which are positioned to make a video recording of a real-world target field 20, or a respective subarea thereof, and output a respective raw video segment onto the data network 30. Each such raw video segment may be of a given length, such as for instance n seconds, where n is any value suitably chosen in consideration of implementation details, and contain recorded video contents, for instance, in the form of H.264 or H.265 encoded video data. In one embodiment each raw video segment comprises recorded video contents in the form of H.264 encoded video data. In the disclosed embodiment of FIG. 1, the real-world target field 20 is a soccer pitch, but the invention has no specific limitations in this regard.

Different Arrangements of Network Video Camera(s)

Noticeably, each network video camera 10a-10e may be mounted at a respective stationary position with respect to the real-world target field 20, and it need not have any real (physical) pan, tilt or zoom capabilities. Hence, a very efficient solution is provided in terms of component cost, installation and/or maintenance. Alternatively, each network video camera 10a-10e is mounted at a respective position which is movable with respect to the real-world target field 20.

In one embodiment, the real-world target field 20 is recorded by a single ultra-wide view network video camera 10a, essentially covering the entire target field 20.

In other embodiments, the real-world target field 20 is recorded by a plurality of network video cameras 10a-10e. For instance, as seen in FIG. 1, field overview cameras 10a, 10b and 10c may be mounted at the center of the soccer pitch 20 and oriented in appropriate directions so as to record different subareas of the soccer pitch 20, with or without overlap. If the cameras are mounted close to each other with overlapping fields of view, the captured frames can be stitched together and used as if captured by a single camera with a wide field of view. Detailed view cameras 10d and 10e may be mounted, for instance, near the two goals at either sides of the soccer pitch 20, thereby serving to provide close-up video views of soccer action near the goals.

The system 100 comprises cloud-based back-end functionality 40 acting as a service bridge between the network video camera(s) 10a-10e and the users 60a-60c via the data network 30. The back-end functionality 40 comprises a number of units (or modules or devices) which shall be seen as functional elements rather than structural/-physical; they may be structurally implemented for instance by one or more server computers with suitable operating system, software and networking access capabilities.

Back-End—Camera Calibration

Hence, the back-end functionality 40 comprises a back-end camera calibration unit 42 which is adapted to register calibration data for the or each of the network video camera(s) 10a-10e. In one embodiment, the calibration of each network video camera involves determining a relative position and orientation of the respective network video camera with respect to a three dimensional world space for the target field.

In one embodiment, the calibration of each network video camera 10a-10e involves determining both extrinsic and intrinsic parameters. The extrinsic parameters describe the position and orientation of the respective network video camera 10a-10e with respect to the world space for the target field 20. The intrinsic parameters describe the internal properties of the camera 10a-10e, such as focal length and lens distortion.

The camera calibration can be done locally at each network camera by an installer person using an appropriate tool, such as a laptop computer, a mobile terminal or a tablet computer. Alternatively or additionally, the camera calibration can be done centrally, e.g. at the back-end functionality 40. In such a case, the back-end camera calibration unit 42 may automatically detect, or a back-end operator may manually mark, known features of the target field 20 in images from the cameras, such as for instance the border lines, penalty areas, center line and center circle of the soccer pitch 20. Using the known geometry of the sport field, the relative position of the cameras can be accurately estimated without any large overlap of the cameras' fields of view using methods known from the literature.

Using the calibration, a pixel coordinate from a captured image can be converted to a direction, or a ray, in the three dimensional world space. This calculation can be done offline for a chosen set of grid points (mesh) in the source frames, facilitating fast real-time calculations by interpolation of the grid points.

Hence, the back-end camera calibration unit 42 registers the calibration results having been determined in any of the ways referred to above for each calibrated network video camera(s) 10a-10e by obtaining the determined relative position and orientation, and saving them as metadata for the respective network video camera. The metadata may, for instance, be stored in a back-end video storage 41.

As previously described, the relative position and orientation can be seen as extrinsic calibration parameters for the respective network video camera. The calibration may also involve intrinsic calibration parameters, such as focal length and distortion, for the respective network video camera.

Back-End—Video Processing and Storage/Buffering

The back-end functionality 40 also comprises a back-end video processing unit 44, which is connected to the data network 30 and adapted to receive the respective raw video segment(s) as recorded by the network video camera(s) 10a; 10a-e. The video processing unit 44 is also adapted to store or buffer video contents of the respective raw video segment(s) in the back-end video storage 41.

The back-end video storage 41 may be any media suitable for storing digital video contents and the aforementioned metadata of each network video camera. For instance, the back-end video storage 41 may be implemented as one or more magnetic hard disks, solid state drives or random access memories, included in or connected to (locally or via the data network 30) any of the units of the back-end functionality 40.

Back End—Video Streaming

A back-end video streaming unit 46 of the back-end functionality 40 is adapted to stream the stored or buffered video contents and the saved metadata for the respective network video camera(s) 10a; 10a-e onto the data network 30. The streaming may be made according to any commercially available standard, for instance, being based on H.264 video encoding.

In one embodiment, the video content originating from the network video cameras 10a-e are distributed from the data network 30 to either be used as real-time streaming or in post recording.

The Client Side

The system 100 also comprises a plurality of client devices 50a-50c for use by the plurality of users 60a-60c. Each client device may, for instance, be implemented as a mobile terminal (e.g. smartphone), a tablet computer, a smart watch, a personal computer, etc. The client device 50a-50c is adapted to receive the streamed video contents and the metadata from the video streaming unit 46 over the data network. To this end, each client device 50a-50c has a suitable networking interface, such as IEEE 808.11, UMTS, LTE, etc. Each client device 50a-50c also has a display 52a-52c. Moreover, each client device 50a-50c has suitable video decoding capabilities, e.g. for H.264 video decoding. In addition, each client device 50a-50c has video playback functionality. The video playback functionality can be provided on the application level (i.e., as an app), as a plug-in to another application (e.g. a web browser), or at lower levels in the program stack in the client device.

Figure 3:
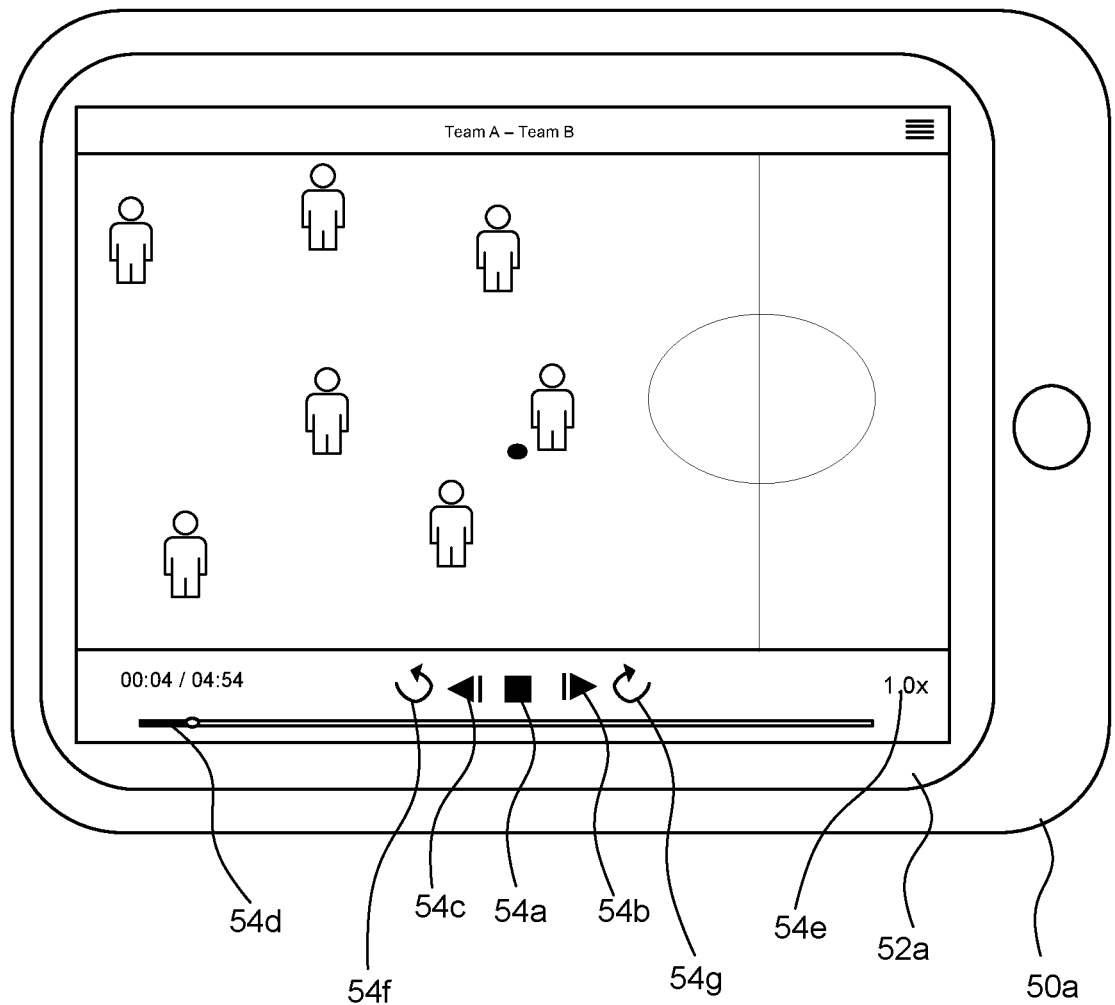
FIG. 3 is a schematic front view schematically illustrating the interface of a client device according to an embodiment.

The video playback functionality of each client device 50a-50c is moreover adapted to determine a chosen virtual pan-tilt-zoom value, as shown in FIG. 3, and present the (decoded) video contents by projecting directions, or rays, in the three dimensional world space onto the display 52a-52c of the client device based on the chosen virtual pan-tilt-zoom value and the metadata. In the simplest case, the pan-tilt-zoom value defines a projection plane of the virtual camera, and the screen coordinate of a direction, or ray, in space is determined by where it intersects the projection plane. How the directions, or rays in world space map to pixels in the source images is determined by the camera calibration. Plane projections are not appropriate for very wide fields of view. Hence, artificial distortion can be applied to the virtual camera to better present wide fields of view on the screen of the user device. The term direction may be interpreted as a direction from the camera capturing the video, making it equivalent to a ray, which has a starting point and a direction.

An embodiment of a client device 50a playing a video stream is shown in FIG. 3. The display 52a is arranged to display graphical objects 54a-d such as a virtual key, menu item, etc. to control the video recording and playback service. The graphical objects may for example be a stop/play function 54a, a forward 54b and backward function 54c to go forward/backwards in a frame, a time line 54d showing lapsed time of the video stream, playback speed function 54e to change the playback speed, functions 54f, 54g for rewinding or skipping forward a predetermined time period, for example 5 seconds. Further graphical objects relating to different camera views and slow motion functions could also be present.

Choosing the Virtual Pan-Tilt-Zoom Value

In one embodiment, targeted particularly for applications where the inventive automated video recording and playback services are provided as a tool for coaches and athletes to analyze and discuss athletic performance on a sports field, the virtual pan-tilt-zoom value can be chosen by each individual user 60a, 60b or 60c by interaction in a user interface of the respective client device 50a, 50b or 50c. When the client device has a touch-sensitive user interface, such interaction may involve dragging on the display surface to command a desired direction for the pan and tilt components of the virtual pan-tilt-zoom value, and pinching on the display surface to command a change in the zoom component of the virtual pan-tilt-zoom value. Other ways known per se of interacting in a user interface to command desired changes in virtual pan, tilt and zoom may alternatively be used.

This embodiment hence allows a first user 60a and a second user 60b to concurrently play back the video stream and use independently chosen and mutually different virtual pan-tilt-zoom in the presented video contents on the displays 52a and 52b of the respective client devices 50a and 50b.

In another embodiment, targeted particularly for applications where the inventive automated video recording and playback services are provided in the form of live streaming of, for instance, sports events to remote viewers, the virtual pan-tilt-zoom value can be chosen by an entity at the back-end side. For instance, a human operator may watch the video stream and control (e.g. repeatedly or continuously adjust) the virtual pan-tilt-zoom value to match the expected preference of the remote viewers, depending on the momentary developments in the ongoing sports event. The thus chosen virtual pan-tilt-zoom value may be included in the video stream from the video streaming unit 46, or sent in a separate control stream synchronized with the video stream, and retrieved by the playback functionality in each client device 50a, 50b, 50c. In this embodiment, all users (remote live stream viewers) 60a-60c can experience the same virtual pan-tilt-zoom in the presented video contents on the displays 52a-52c of the respective client devices 50a-50c, but they can also choose to control the virtual pan-tilt-zoom according to their own preference at any point during playback. Hence, multiple users 60a-60c can independently pan, tilt and zoom in the video both in real-time and in post recording.

The sequence of virtual pan-tilt-zoom values may be used to let the video processing unit 44 reproject the video and generate a stream that can be viewed on any standard video playback device, such as a TV.

Figure 4:
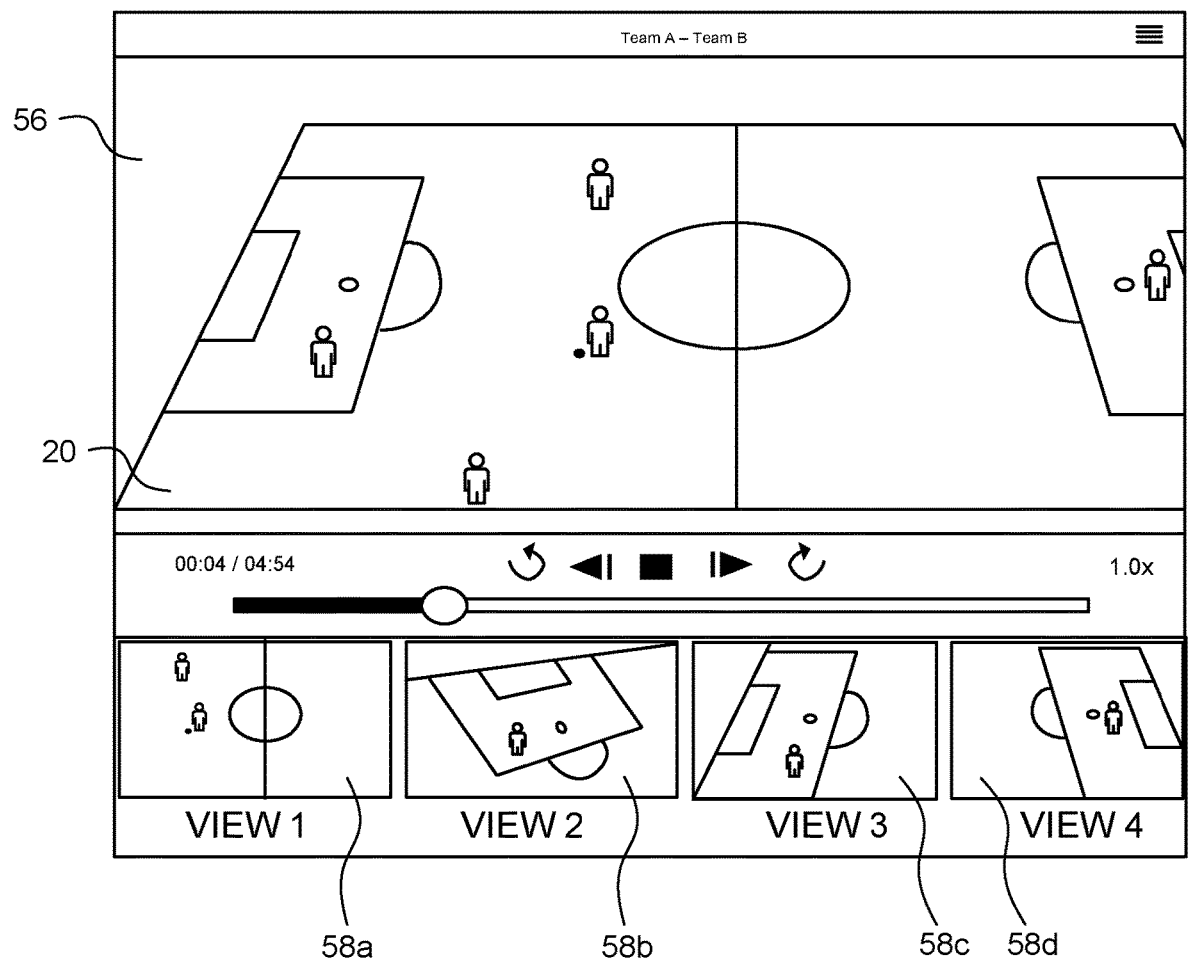
FIG. 4 is a schematic front view schematically illustrating the interface of a client device according to an embodiment.

FIG. 4 shows an embodiment where the real-world target field 20 is recorded by a plurality of network video cameras 10a-10e and where the user 60a-60c, being a remote stream viewer, can choose between different camera views 56, 58a-d. The video stream from the different camera views are shown as a main stream 56 and several additional views 58a-d. The additional views 58a-d are shown as thumbnails (VIEW 1, VIEW 2, VIEW 3 and VIEW 4). The additional views 58a-d show video streams from a plurality of cameras 10a-e and are arranged adjacent to the main video 56 in the user interface of the client device 50a-c. The user 60a-60c can select a video stream to be the main stream 56 by interacting with their respective client device 50a, 50b or 50c. Such an interaction may involve clicking on the desired thumbnail to change that additional view to be the main stream. When a user 60a-60c selects a video stream as its main stream 56 the transition between the views will be visible to the user to facilitate the viewing of the stream during the change. Hence, the user 60a-c will see how the pan-tilt-zoom values change when an additional view becomes the main stream view.

Automatically Choosing the Virtual Pan-Tilt-Zoom Value

In a refined version of the latter two embodiments, the virtual pan-tilt-zoom value is chosen by a tracking unit 48 comprised in the back-end functionality 40. The tracking unit is adapted to apply video object tracking techniques known per se by way of real-time analysis of the video stream (or the raw video segments) to automatically detect an estimated current activity center in the ongoing activity (e.g. sport event) on the target field 20, adjust the virtual pan-tilt-zoom value accordingly and either include the adjusted virtual pan-tilt-zoom value in the video stream from the video streaming unit 46, or send it in a separate control stream synchronized with the video stream from the video streaming unit 46. The tracking unit 48 may be trained either automatically, for example by an algorithm, in the system or by manual input. In this embodiment, there is thus no need for manual camera handling neither for recording the stream of for managing the pan-tilt-zoom. Hence, no camera man or a human operator is needed.

Multi-Camera Embodiments

As already mentioned, in some embodiments the real-world target field 20 is recorded by a plurality of network video cameras 10a-10e. In such embodiments, the back-end video processing unit 44 is adapted to analyze the respective raw video segments as recorded by the field overview cameras 10a-10c and detailed view cameras 10d-10e, so as to identify frames in the respective video segments which were recorded at the same time, and then synchronize these frames so that they appear concurrently in the video contents streamed by the video streaming unit 46. To this end, each network video camera includes timestamps of the recorded frames in the raw video segments.

However, there may be time delays between the different raw video segments at the time of recording, at the time of transmission to the back-end functionality 40, or both. To this end, each network video camera 10a-10e regularly synchronizes its local real-time clock against a networked absolute time reference, such as an Internet time source. Moreover, each network video camera 10a-10e includes an absolute start time value in or with the raw video segments transmitted to the back-end functionality 40. The video processing unit 44 accordingly uses these absolute start time values together with the time stamps of the recorded frames in the raw video segments to synchronize the frames of the raw video segments from the different network video cameras 10a-10e.

The raw video segments from the field overview cameras 10a-10c can be handled in a special way. The back-end video processing unit 44 (or the video streaming unit 46) generates a composed (or stacked) video stream from the synchronized frames of the respective raw video segments from the field overview cameras 10a-10c. For instance, when there are two field overview cameras 10b and 10c, each essentially covering one half of the real-world target field 20 (e.g. soccer pitch), the synchronized frames may be stacked (see FIGS. 5a-c), for instance put one above the other or side by side, in one and the same frame of the composed video stream sent to the client devices 50a-50c.

Figure 5A:
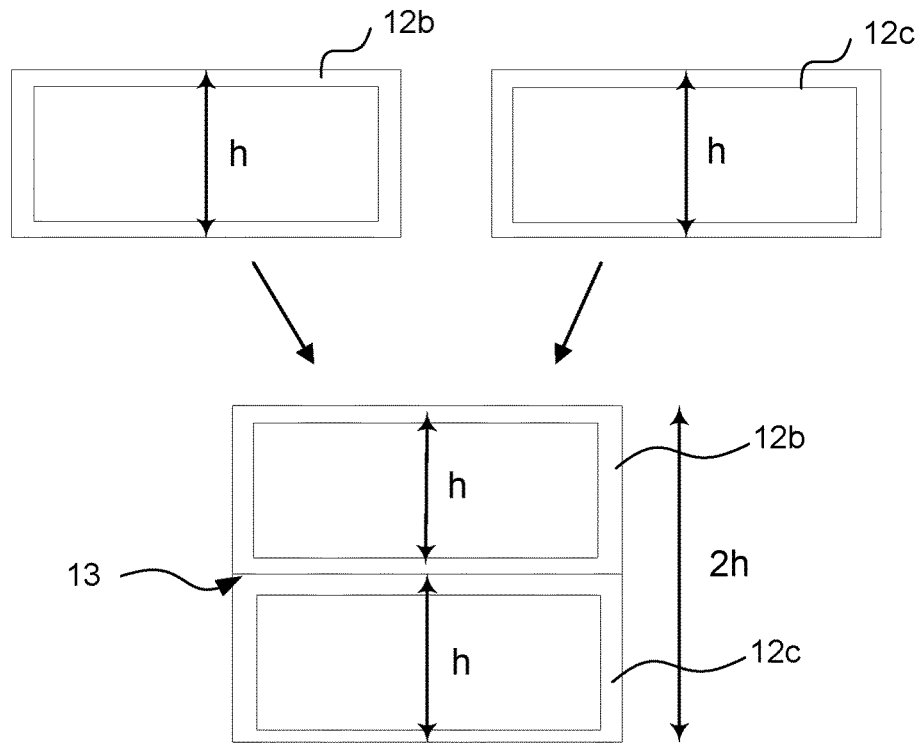
FIGS. 5a-c are schematic front views showing stacking of frames according to an embodiment.

In an embodiment shown in FIG. 5a, two frames 12b, 12c are generated from the two field overview cameras 10b and 10c. The frames 12b, 12c each has a height of h. The two frames 12b, 12c are then stacked by putting one frame 12b above the other frame 12c in one single frame 13 of the composed video stream, resulting in a frame 13 with height 2h.

Figure 5B:
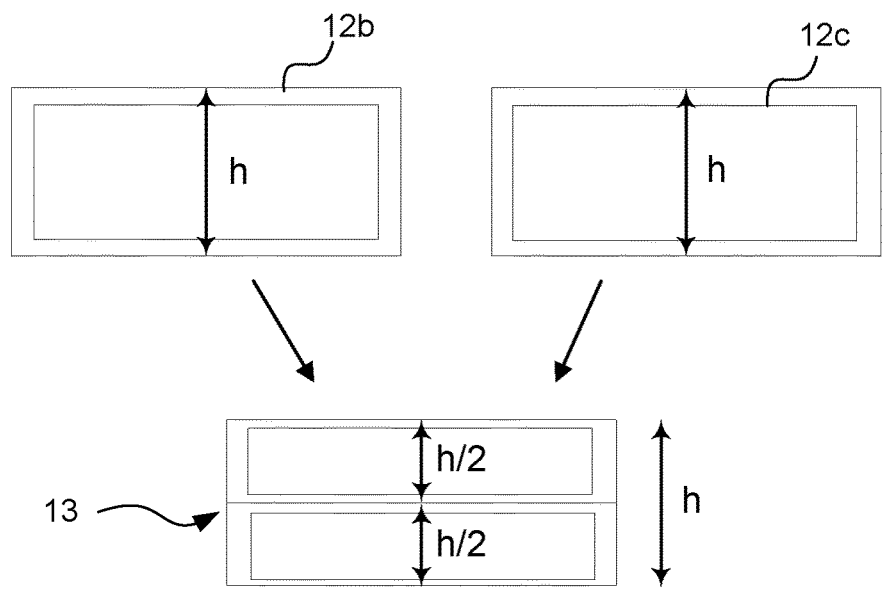

In some embodiments, before being stacked, the heights of the frames 12b, 12c are scaled on the height so that the total height of the single frame has the same height as one of the original frames 12b, 12c, as illustrated in FIG. 5b. Hence, the height of the frames being stacked is ½h, and the total height of the single stacked frame 13 is h. The width of the frames remains the same. Scaling height and width separately, resulting in a frame with standard aspect ratio, makes it possible to get high resolution while enjoying support from a wide range of video decoders.

In one embodiment, the resolution of each frame 12b, 12c before being stacked is 4K, i.e. the horizontal resolution is in the order of 4,000 pixels and the vertical resolution in the order of 2,000 pixels. After the two frames are stacked into one single frame 13, the total resolution of said stacked frame is 4K.

The relative position and orientation of each field overview camera according to the saved metadata will allow the client device 50a-50c to project the correct contents from the synchronized frames in the stacked frame, depending on the chosen virtual pan-tilt-zoom value. Letting the playback device receive the frames from the different video sources in a single stacked video has two main advantages for the playback device. First of all, it only needs a single video decoder and additionally the frames from the different video sources are automatically synchronized.

Figure 5C:
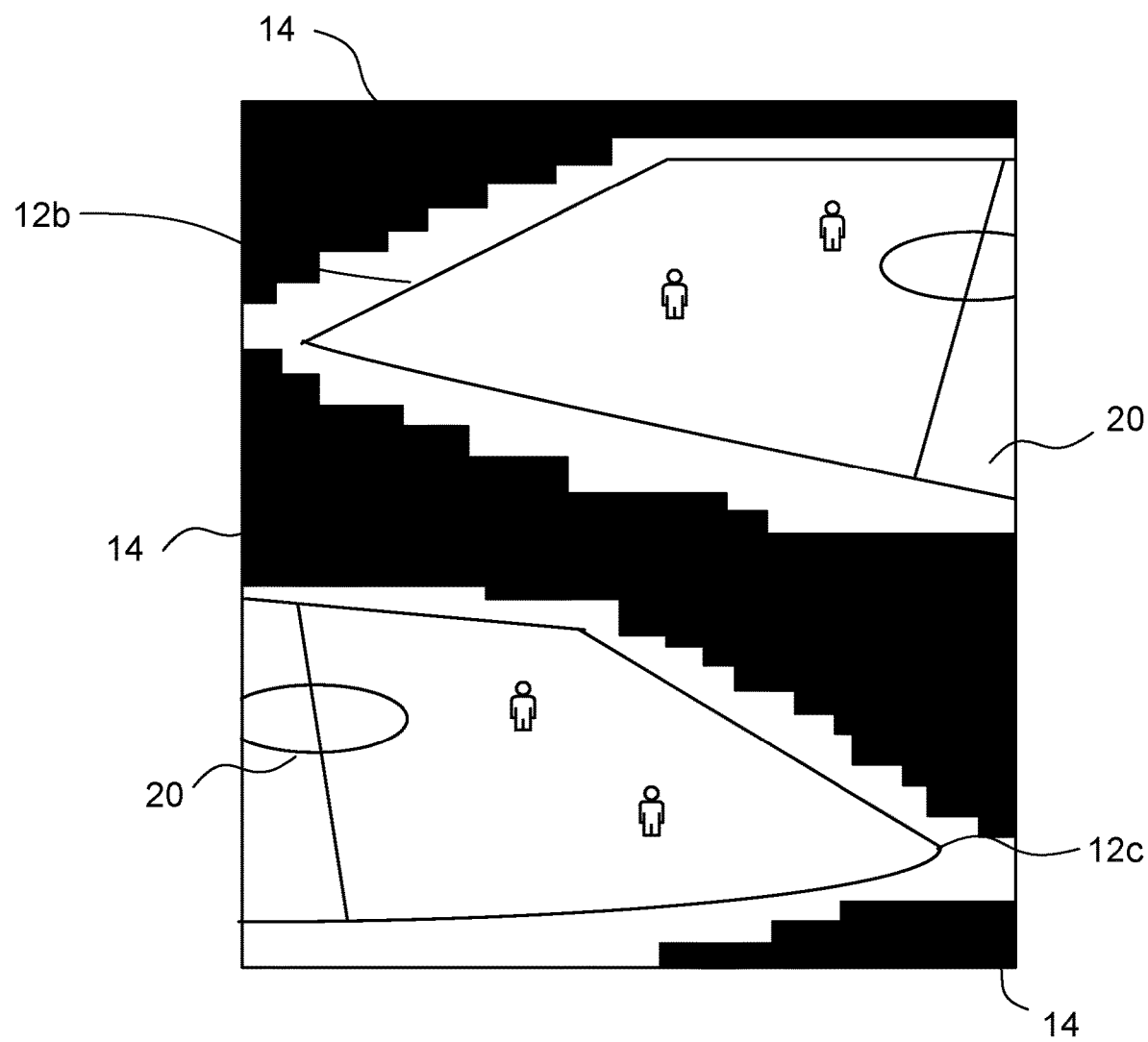

FIG. 5c shows an embodiment where two field overview cameras 10b and 10c are arranged to cover an entire sports field where also areas that are not of interest are covered. The two frames 12b, 12c shown are generated from the two field overview cameras 10b and 10c and are stacked on top of each other. The areas which are not of interest are marked as blacked-out pixels 14 in the figure. The blacked-out pixels 14 can be used to transfer other information.

Figure 6A:
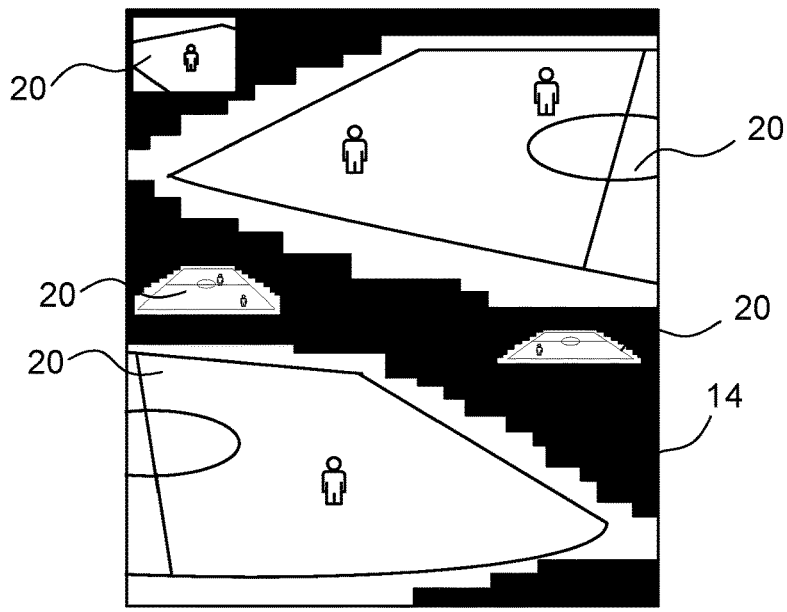
FIGS. 6a-b are schematic front views showing blacked-out pixels according to an embodiment.
Figure 6B:
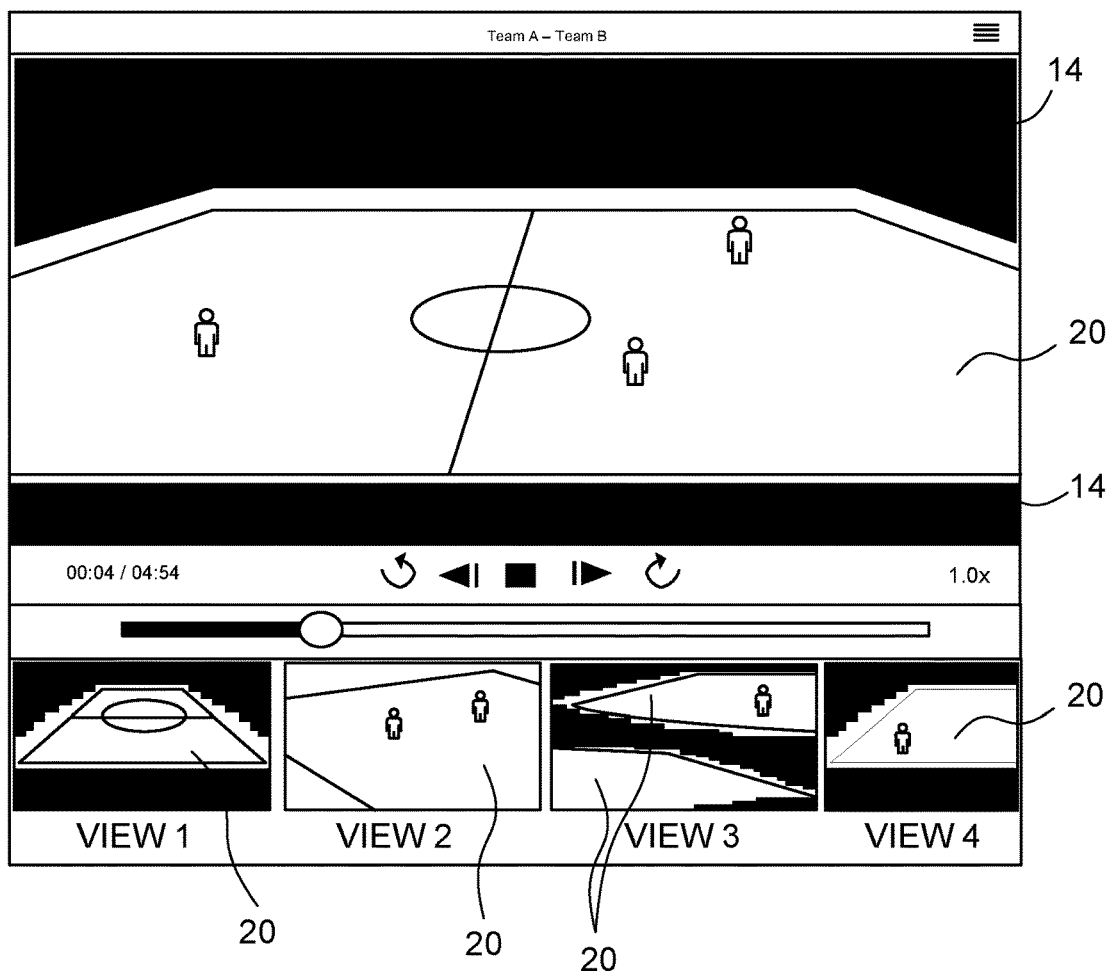

In one embodiment, as shown in FIGS. 6a and 6b, the blacked-out pixels 14 can be used to transfer scaled-down versions of the frames from the other cameras. This is shown in FIG. 6a. The scaled-down versions of the frames may be used to show thumbnails of the video streams from all cameras adjacent to the main video, as shown in FIG. 6b. The blacked-out pixels 14 could additionally be used when a user switches video streams. When switching which video stream to view, the blacked-out pixels 14 may then be used to show a low-resolution version of the newly selected stream while the full-resolution version is being buffered from the video streaming unit 46.

When filming a field from the side, different parts of the field will be at different distances from the camera, thus receiving different resolutions in terms of pixels per meter of the field. In order to transfer or store a video with sufficient resolution of the entire field while keeping data size down, it may be of interest to transform the frames to get a more uniform resolution across the field. This can be seen as a context aware video compression. The transformed frames are then encoded, for instance, using H.264. Using the known transform described in this paragraph in combination with the known camera calibration, the video can be unwarped in the client devices 50a-50c and presented to the users 60a-60c without any distortion.

The video contents from the detailed view cameras 10d-10e are sent in separate video streams by the video streaming unit 46, but where each frame in each stream is timestamped so that it can be synchronized with the composed video stream. This allows each user 60a-60c to switch between the composed video stream, i.e. to look at the field overview at a chosen virtual pan-tilt-zoom value, and any of the video streams from the detailed view cameras 10d-10e, i.e. to instead have a detailed look, and vice versa, while making sure the same time instant is displayed in all streams.

Tagging

In one embodiment, the video playback functionality of each client device 50a-50c has a function allowing the user 60a-60c to insert a tag in the video contents presented on the display 52a-52c. The tag has a time parameter (reflecting the temporal position of the tagged frame in the video stream, expressed as, for instance, a hh:mm:ss value, a frame number, a time stamp, or combinations thereof) as well a spatial parameter (reflecting a real-world object in the tagged frame, and/or a position of a pixel or group of pixels in the tagged frame). The tag is transmitted by the client device in question back to a tagging unit 49 of the back-end functionality 40, thereby allowing the tag to be stored in the back-end storage 41 and also allowing later retrieval when the relevant video contents are streamed a next time. Tagging can thus be performed when the user 60a-60c is watching in real-time during the recording to the video, or when watching the video at a later time.

In this way, coaches and team members may share common information by tagging contents in the video contents during playback. The tagging function allows coaches and others to quickly navigate through extensive amounts of video material.

The information on which the tagging is based may also originate from other sources than the cameras 10a-e and may be inserted automatically by the system (e.g. not by the user). In one embodiment the tag comprises information gathered by a heart rate monitor in the form of a watch, chest strap or similar wearable device worn by the athlete. The tag may comprise information relating to the heart rate, gps-position, step counter and similar information relating to the health or physics of the athlete. The wearable device comprises means for communication in order to transmit the gathered information to the system. The communication means arranged in the wearable device may for example be Bluetooth, ANT or other low-power radio links.

In one embodiment, the information gathered by the wearable device is only shown once the user inserts a tag on the athlete wearing said device. In other embodiments the information gathered from the wearable device is always shown for all connected athletes irrespective of the used tags.

Drawing

Figure 7A:
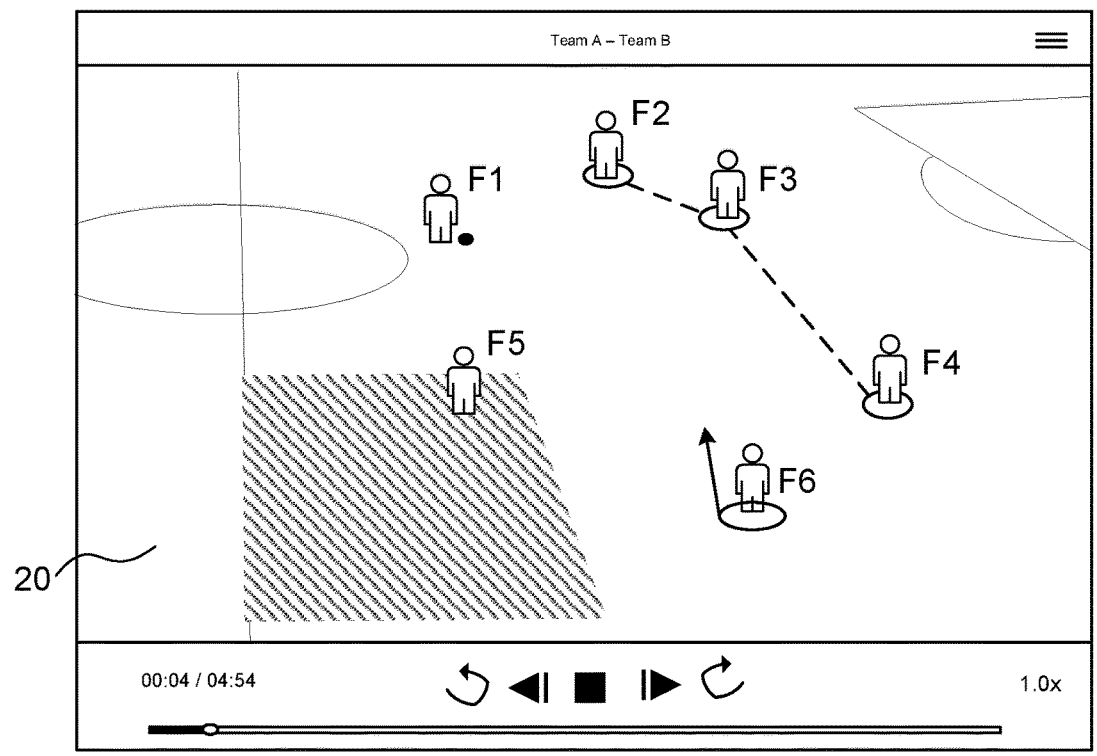
FIGS. 7a-b are schematic front views schematically illustrating the interface of a client device when using the functions of tagging and drawing according to an embodiment.
Figure 7B:
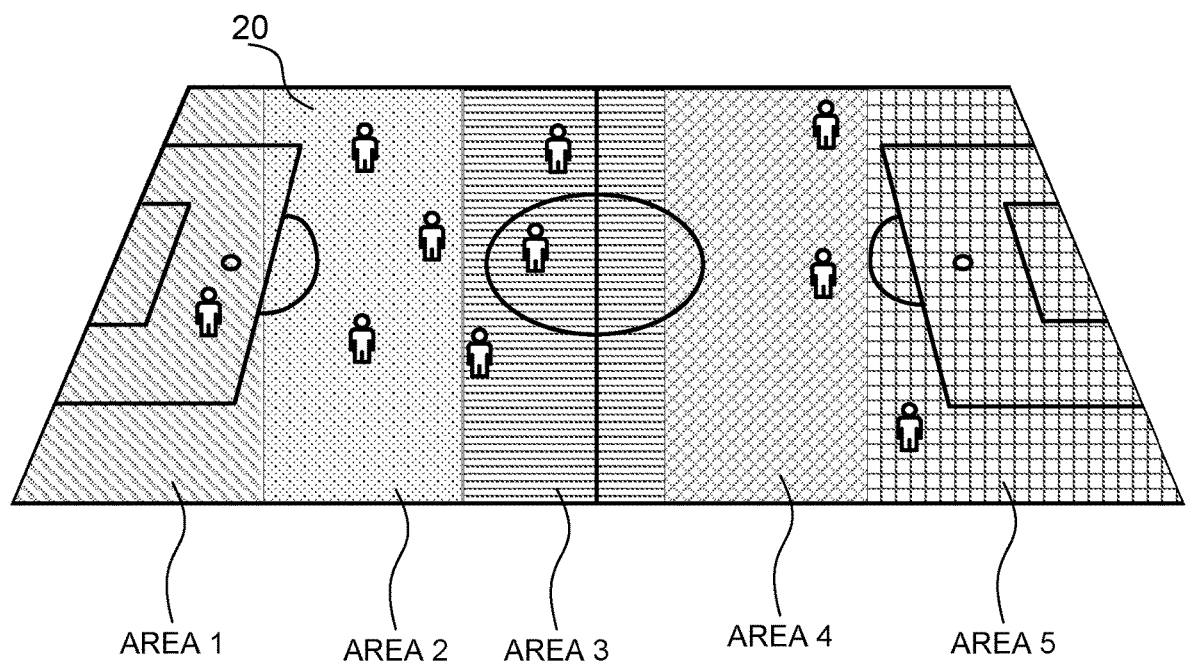

In a more refined embodiment, the spatial parameter of the tag represents a drawing made by one of the users 60a-60c in a presented video frame during playback. The drawing may, for instance, be a geometrical object such as a line, circle or rectangle, as is illustrated in FIG. 7a-b. This can advantageously be used as follows.

The in-frame drawing feature enables the user 60a-60c to draw in the videos captured by one of the network cameras. For example, the user could mark the position of an athlete or draw how he should act in the target field. The in-frame drawing features may be performed by touching or clicking on the display 52a-52c on the client device 50a-50c.

An example is seen in FIG. 7a, where six athletes in the form of soccer players F1-F6 are shown on real-world target field 20 in the form of a soccer pitch. The soccer player F1 is not marked, whereas the position of the soccer player F2-F4 are all marked, as indicated by the surrounding circle. The chopped line between the soccer players F2-F4 is drawn by the user 60a-60c to for example create a virtual line of defenders on the pitch and/or to connect the position of the individual players F2-F4 to each other. The user 60a-60c may also indicate a special area of interest in the target field 20, here marked as a lined box. This area may represent an area which the user 60a-60c wishes the player F1-F6 to move to or an area which is especially important due to other reasons. The position of the soccer player F6 is marked by the surrounding circle, and the desirable direction of movement of the player F6 is drawn by drawing an arrow in the desired direction.

FIG. 7b shows an embodiment where the user or the system has generated a plurality of virtual areas (AREA 1, AREA 2, AREA 3, AREA 4, AREA 5) on the target field 20. The virtual areas may for example be used to differentiate between different tactical areas of the target field 20, to help visualize different team and player setups and formations. AREA 1 and AREA 5 may for example be the tactical area where the football goal and defensive team formation is setup, AREA 3 is the center field area, and AREA 2 and AREA 4 are the offensive team formation areas between the goals and the center circle. Although the areas in FIG. 7b are shown in the form of a rectangle, it should be understood that the areas could have other shapes, such as a square, triangle, circle or a grid. The areas may also be in the form of a text string, images, animations etc.

In one embodiment the user 60a-60c draws and marks out the areas on the target field 20. In an alternative embodiment the system is provided with pre-saved areas, for example stored in the back-end storage 41 or in the tagging unit 49. The pre-saved areas can be activated by the system itself or by a user 60a-60c. The pre-saved areas may be generated by using parameters automatically gained or generated from the target field 20 and/or by user input regarding parameters of the target field 20. The pre-saved areas may for example be templates used by coaches, athletes or sports journalists. Although the areas in FIG. 7b are shown in one plane, it should be understood that the tags, such as a drawing or a pre-defined area, can be used in video streams showing different perspective of the target field 20.

When the same or another user watches the same scene, but using a second one of the network cameras mounted in a different position, the features that were drawn using the first camera will still appear to be in the same position in the real world. When the user draws something in a frame from the first camera, the pixel coordinates can be converted to directions, or rays, in the three dimensional world space, using the calibration of the first camera. The directions, or rays, can be converted to positions in the world space by finding the intersection between the direction, or ray, and the ground plane of the sport field. The positions on the ground plane can be projected onto frames from the second camera, using the calibration of the second camera.

If several users 60a-60c are watching the same video stream, in some embodiments the drawing made by one user 60a will appear on the client device 50a-50c corresponding to the other users 60b, 60c. The tags can thus be shared online in real time. In one embodiment, the tag is transmitted by the client device which belongs to the user 60a making the tag back to the tagging unit 49 of the back-end functionality 40. The tag is stored in the back-end storage 41 and other users 60b-60c can retrieve, via its respective client devices 50b, 50c, the tags generated by the first user 60a. In this way the coach 60a can draw instructions on one device 50a which are seen on the client devices 50b, 50c of the athletes.

By the combination of editing tools and the tagging system an improved video system is achieved. Coaches and other analysts is allowed to directly in the video visualize events and demonstrate tactic on a screen using lines, arrows, hand drawn objects etc. in order to give more detailed and efficient feedback to the athletes.

Figure 8A:
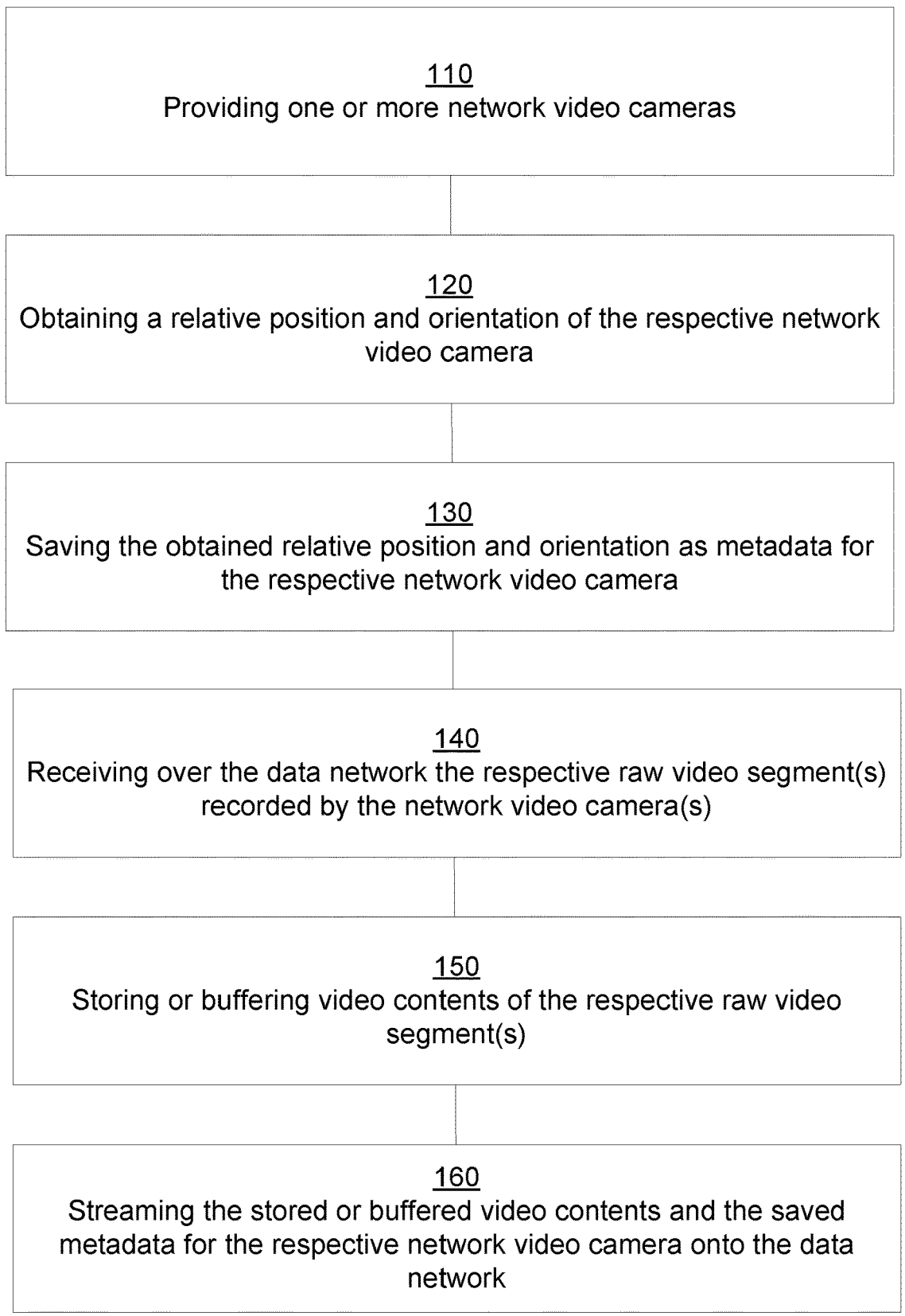

FIG. 8a-b disclose a method for providing virtual pan-tilt-zoom, PTZ, video functionality to a plurality of users 60a-60c over a data network 30. FIG. 8a illustrates a first part of said method. In a first step 110, one or more network video cameras are provided and positioned to make a video recording of a real-world target field, or a respective subarea thereof, and output a respective raw video segment onto the data network.

For the purpose of calibrating the one or each of the network video camera(s), the method also involves obtaining 120 a relative position and orientation of the respective network video camera with respect to a three dimensional world space for the target field. The obtained relative position and orientation is saved 130 as metadata for the respective network video camera.

The system then receives 140, over the data network, the respective raw video segment(s) recorded by the network video camera(s). The respective raw video segment(s) are then stored or buffered 150 in a cloud-based video storage. In a next step the stored or buffered video contents and the saved metadata are streamed 160 for the respective network video camera onto the data network.

FIG. 8b illustrates a method for use in respective client devices for use by respective one of the plurality of users. The client device receives 170 the streamed video contents and the metadata. In a next step the client device determines 180 a chosen virtual pan-tilt-zoom value. The video contents is presented 190, on a display the client device, by projecting directions, or rays, in the three dimensional world space onto the display based on the chosen virtual pan-tilt-zoom value and the metadata.

General Inventive Concepts

As is clear from the above description, one inventive aspect can be seen as a system for providing virtual pan-tilt-zoom, PTZ, video functionality to a plurality of users over a data network.

The system comprises one or more network video cameras positioned to make a video recording of a real-world target field, or a respective subarea thereof, and output a respective raw video segment onto the data network.

The system also comprises a back-end camera calibration unit which is adapted to:
  obtain a relative position and orientation of the respective network video camera with respect to a three dimensional world space for the target field; and
  save the obtained relative position and orientation as metadata for the respective network video camera.

The system also comprises a back-end video processing unit, connected to the data network and adapted to:
  receive the respective raw video segment(s) recorded by the network video camera(s); and
  store or buffer video contents of the respective raw video segment(s) in a back-end video storage.

Furthermore, the system comprises a back-end video streaming unit adapted to stream the stored or buffered video contents and the saved metadata for the respective network video camera onto the data network.

Finally, the system comprises a plurality of client devices for use by the plurality of users. Each client device is adapted to:
  receive the streamed video contents and the metadata;
  determine a chosen virtual pan-tilt-zoom value; and
  presenting, on a display the client device, the video contents by projecting directions in the three dimensional world space onto the display based on the chosen virtual pan-tilt-zoom value and the metadata.

Another inventive aspect can be seen as method for providing virtual pan-tilt-zoom, PTZ, video functionality to a plurality of users over a data network.

The method involves providing one or more network video cameras positioned to make a video recording of a real-world target field, or a respective subarea thereof, and output a respective raw video segment onto the data network.

For the purpose of calibrating the or each of the network video camera(s), the method also involves:
  obtaining a relative position and orientation of the respective network video camera with respect to a three dimensional world space for the target field; and
  saving the obtained relative position and orientation as metadata for the respective network video camera.

The method also involves:
  receiving over the data network the respective raw video segment(s) recorded by the network video camera(s); and
  storing or buffering video contents of the respective raw video segment(s) in a cloud-based video storage.

Furthermore, the method involves streaming the stored or buffered video contents and the saved metadata for the respective network video camera onto the data network.

Finally, the method involves, in respective client devices for use by respective one of the plurality of users:
  receiving the streamed video contents and the metadata;
  determining a chosen virtual pan-tilt-zoom value; and
  presenting, on a display the client device, the video contents by projecting directions in the three dimensional world space onto the display based on the chosen virtual pan-tilt-zoom value and the metadata.

The invention claimed is:

1. A system for providing virtual pan-tilt-zoom, PTZ, video functionality to a plurality of users over a data network, the system comprising:
  one or more network video cameras positioned to make a video recording of a real-world target field, or a respective subarea thereof, and output a respective raw video segment onto the data network;

a back-end camera calibration unit which is adapted to obtain a relative position and orientation of the respective network video camera with respect to a three dimensional world space for the target field, and to save the obtained relative position and orientation as metadata for the respective network video camera;

a back-end video processing unit, connected to the data network and adapted to receive the respective raw video segment(s) recorded by the network video camera(s), and to store or buffer video contents of the respective raw video segment(s) in a back-end video storage;

a back-end video streaming unit adapted to stream the stored or buffered video contents and the saved metadata for the respective network video camera onto the data network; and a plurality of client devices for use by the plurality of users, wherein each client device is adapted to:
receive the streamed video contents and the metadata;
determine a chosen virtual pan-tilt-zoom value; and
present, on a display of the client device, the video contents by projecting directions, in the three dimensional world space, onto the display based on the chosen virtual pan-tilt-zoom value and the metadata, wherein the virtual pan-tilt-zoom value defines a projection plane of a virtual camera, and wherein a display screen coordinate of a direction in space is determined by where it intersects the projection plane.

2. The system as defined in claim 1, wherein the back-end camera calibration unit is further adapted to obtain intrinsic parameters of the respective network video camera with respect to the three dimensional world space for the target field, and to save the obtained intrinsic parameters as metadata for the respective network video camera.

3. The system as defined in claim 1, wherein the system comprises two or more network video cameras, and wherein the back-end video processing unit is further adapted to analyze the respective raw video frames as recorded by the two or more network video cameras and to synchronize these frames.

4. The system as defined in claim 3, wherein the back-end video processing unit or the video streaming unit is further configured to generate a stacked video stream from the synchronized frames of the respective raw video segments from the two or more network video cameras.

5. The system as defined in claim 4, wherein at least one of the synchronized frames of the respective raw video segments from the two or more network video cameras in the stacked video stream are scaled-down and used to show at least one thumbnail of the corresponding video streams.

6. The system as defined in claim 1, wherein each client device is further adapted to receive a tag inserted by the user in the video contents presented on the display.

7. The system as defined in claim 6, wherein the tag comprises a spatial parameter which represents a drawing made by the user in the video contents presented on the display.

8. The system as defined in claim 6, wherein the tag comprises a time parameter and a spatial parameter.

9. The system as defined in claim 6, wherein the system further comprises a tagging unit adapted to receive the tag and store the tag in the back-end storage.

10. The system as defined in claim 9, wherein tagging unit allows the tag to be shared with a plurality of client devices.

11. The system as defined in claim 1, wherein each client device is further adapted to receive a tag inserted by the system in the video contents presented on the display.

12. The system as defined in claim 1, wherein the chosen virtual pan-tilt-zoom value defines a projection plane of the one or more network video cameras.

13. The system as defined in claim 1, wherein the system further comprises a tracking unit configured to choose the virtual pan-tilt-zoom value.

14. The system as defined in claim 13, wherein the tracking unit is configured to choose the virtual pan-tilt-zoom value by detecting an estimated current activity center in the ongoing activity in the target field.

15. The system as defined in claim 1, wherein the chosen virtual pan-tilt-zoom value is determined by the user.

16. A method for providing virtual pan-tilt-zoom, PTZ, video functionality to a plurality of users over a data network, wherein the method comprises:
providing one or more network video cameras positioned to make a video recording of a real-world target field, or a respective subarea thereof, and output a respective raw video segment onto the data network;
obtaining a relative position and orientation of the respective network video camera with respect to a three dimensional world space for the target field;
saving the obtained relative position and orientation as metadata for the respective network video camera;
receiving over the data network the respective raw video segment(s) recorded by the network video camera(s);
storing or buffering video contents of the respective raw video segment(s) in a cloud-based video storage;
streaming the stored or buffered video contents and the saved metadata for the respective network video camera onto the data network,
wherein, the method further involves, in respective client devices for use by respective one of the plurality of users:
receiving the streamed video contents and the metadata;
determining a chosen virtual pan-tilt-zoom value; and
presenting, on a display the client device, the video contents by projecting directions in the three dimensional world space onto the display based on the chosen virtual pan-tilt-zoom value and the metadata, wherein the virtual pan-tilt-zoom value defines a projection plane of a virtual camera, and wherein a display screen coordinate of a direction in space is determined by where it intersects the projection plane.

* * * * *